UNITED STATES PATENT OFFICE.

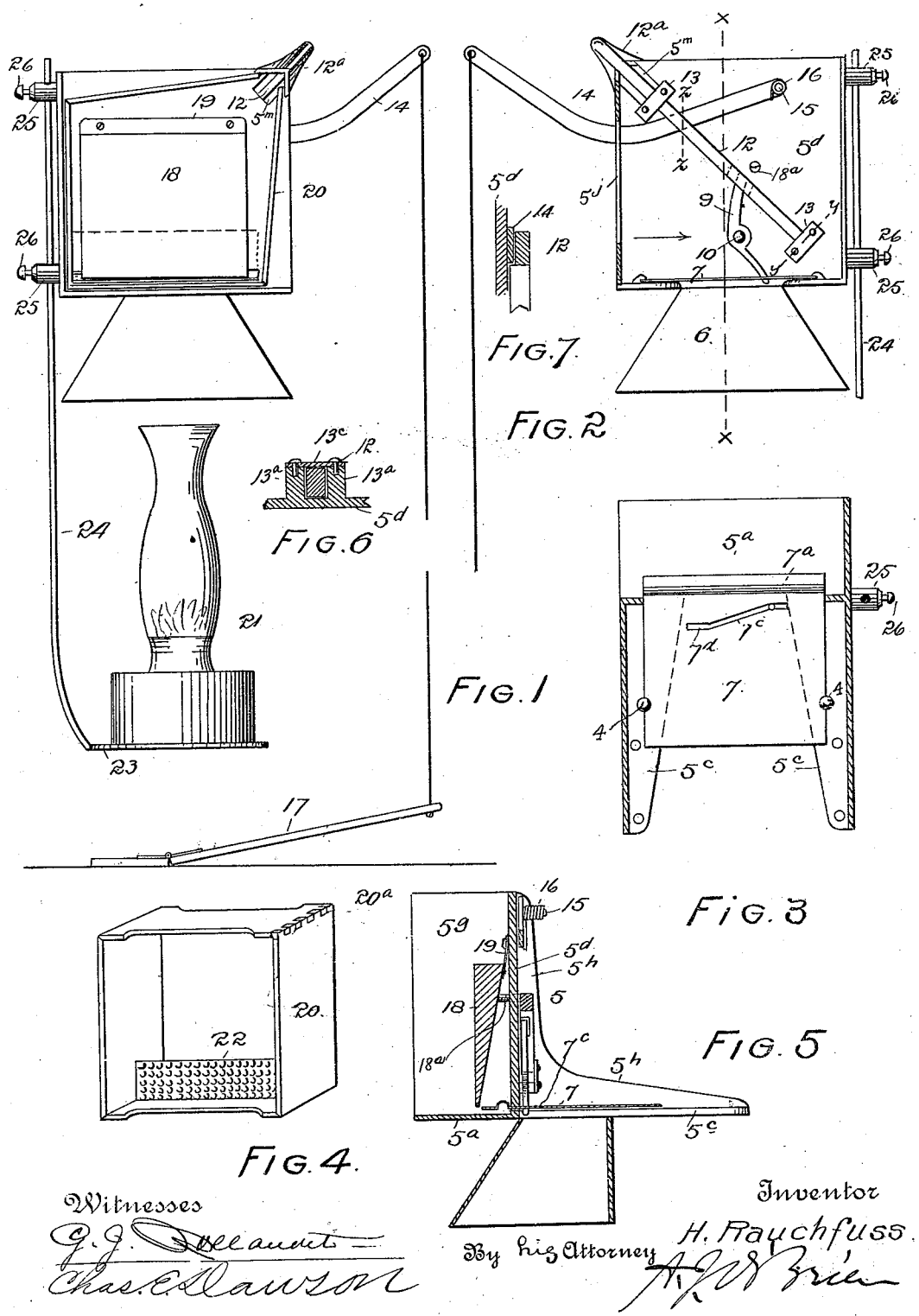

HERMAN RAUCHFUSS, OF DUFF, COLORADO.

COMBINED HONEY-SECTION PRESS AND FOUNDATION-FASTENER.

SPECIFICATION forming part of Letters Patent No. 553,936, dated February 4, 1896.

Application filed May 24, 1895. Serial No. 550,492. (No model.)

*To all whom it may concern:*

Be it known that I, HERMAN RAUCHFUSS, a citizen of the United States of America, residing at Duff, in the county of Arapahoe and State of Colorado, have invented certain new and useful Improvements in a Combined Honey-Section Press and Foundation-Fastener; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a combined section-press and "foundation-fastener."

As indicated by the title, this device is employed in preparing the honey-sections of bee-hives for the use of the bees while storing honey, and will be fully understood by reference to the accompanying drawings, in which is illustrated an embodiment thereof.

In the drawings, Figure 1 is a front elevation of my improved device. Fig. 2 is a rear view of the same, the foot-power and lamp-holder being broken away. Fig. 3 is a horizontal section taken through the frame just above the sliding plate. Fig. 4 is a perspective view of a honey-section with the foundation applied. Fig. 5 is a section taken on the line $x\ x$, Fig. 2, looking toward the right. Figs. 6 and 7 are sections taken on the lines $y\ y$ and $z\ z$, respectively, Fig. 2, the parts being shown on a larger scale.

Similar reference characters indicate corresponding parts in the views.

The numeral 5 designates the frame of the device comprising a bed-plate $5^a$ having forked rearward extensions $5^c$, an upright plate $5^d$, and the flange $5^g$. The frame is further provided with narrow flanges $5^h$, located to the rear of the upright plate and projecting above the bed-plate. Attached to the bed-plate between the parts $5^c$ and projecting downward therefrom is an inverted hopper-shaped device 6 forming a mouth open at the top and bottom. Slidingly supported immediately above the mouth is a thin plate 7 which passes through a slot formed in the frame between the bed-plate and the upright plate $5^d$. This sliding plate has an upwardly-projecting rib or bead $7^a$ formed thereon forward of the upright plate. The sliding plate 7 is provided with a slot into which projects the lower extremity of a lever 9 fulcrumed on the upright plate $5^d$. The slot in the plate 7 comprises an inclined part $7^c$ and a straight part $7^d$. The upper arm of the lever 9 engages a notch formed in a bar 12 occupying a diagonal position on the rear surface of the upright plate $5^d$. This bar is movably mounted on the plate and engages suitable guides 13. As shown in the drawings, (see Fig. 6,) each of these guides is composed of two lugs $13^a$ formed on a frame and a cross-plate $13^c$ attached to the lugs. The upper extremity of the bar 12 is provided with a forwardly-protruding angle-jaw $12^a$. The bar 12 is actuated by a lever 14 fulcrumed on a stud 15, attached to the upright plate $5^d$ and engaging a notch formed in the bar. The stud 15 carries a coil-spring 16 attached to the stud at one extremity and to the lever at the opposite extremity. This spring normally maintains the lever at its uppermost limit of movement.

The extremity of the lever remote from the fulcrum is connected with a hinged foot-lever 17 for operating the machine. As the foot-lever is pressed, the bar 12 is moved toward the lower right-hand corner of the upright plate $5^d$ (see Fig. 2) and the lever 9 actuated in such a manner as to cause its lower extremity to engage the inclined portion $7^c$ of the slot in the plate 7. This plate is thus thrust forward. As the foot-lever is released from pressure, the spring 16 returns the lever 14, and the operating parts connected therewith, to their normal position. The lever 14 moves in a guide-slot $5^j$ formed in the upright part of one of the flanges $5^h$ of the frame.

To the front surface of the upright plate $5^d$ is attached a block 18 having a beveled rear surface. The block is attached to the upright plate by means of a spring-metal strip 19 secured to the plate $5^d$ and the block by suitable fastening devices. This block is adjustable by means of a set-screw $18^a$ inserted in a threaded aperture formed in the plate $5^d$ and adapted to engage the rear surface of the block.

The honey-section, when in position to be acted on by the machine, (see Fig. 1,) surrounds the block 18, while the edges 20ª, provided with tongues and grooves, project into the path of the jaw 12ª when the bar 12 is actuated. As the bar 12 is moved diagonally on the plate 5ᵈ, the jaw 12ª presses the edges 20ª of the honey-section together, thus uniting said edges. (See Fig. 4.)

Below the mouth 6 is supported a lamp 21, which, being lighted, heats the sliding plate 7. As the edges of the honey-section are pressed together, the sliding plate is thrust forward beneath the thin edge of the block 18. The foundation 22, which, as shown in the drawings, consists of a narrow strip of beeswax, is placed against the front surface of the block 18 and held in position by the hand of the operator in such a manner that it projects below the lower edge of the block.

As the honey-sections are of different widths or depths, and as it is desirable to apply the foundation to the center thereof, provision is made for adjusting guide-block 18 whereby its lower edge is made to occupy a central position regardless of the width or depth of the section. This result is accomplished through the instrumentality of the set-screw 18ª. The metal strip 19 possesses sufficient resilience to permit and facilitate this adjustment.

It must be understood that the term "foundation," as employed in this specification, is intended to designate a thin piece or sheet of beeswax of any desired shape, size or extent. It may be a narrow strip, as shown in the drawings, or its area may be equal to that of the entire section. Sometimes several strips are applied to as many sides of the section. In this case the strips are attached one at a time, and the section is changed to bring the sides successively lowermost to which the strips are to be fastened. Then as the heated plate 7 passes forward it engages and melts the lower edge of the wax. The strip 22 is then pressed downward to engagement with the lower side of the section, and is securely fastened by the melted wax.

The lamp 21 is supported on a suitable holder 23 to which is attached a wire arm 24 which passes through apertures formed in studs 25 attached to the side of the frame. This wire arm is held in place by set-screws 26 inserted in threaded apertures formed in the ends of the studs. While the lever 9 is traveling in the inclined part 7ᶜ of the slot in the plate 7, said plate is moving. As soon, however, as the lever enters the straight part 7ᵈ of the slot, the plate ceases to move, and it remains a moment without moving in contact with the wax strip 22, or while the lever 9 is traveling back and forth in the straight part 7ᵈ of the slot. The heated plate is thus kept long enough in contact with the wax to melt it sufficiently for the purpose heretofore explained.

The bead 7ª is located a short distance from the front edge of the sliding plate, but does not pass beneath the block 18. The object of beveling the block on the rear side, whereby its lower edge is quite thin, is to permit the bead 7ª to be formed as closely as possible to the front edge of the plate. The function of this bead is to prevent the melted wax from passing backward on the plate to the rear of the block. The presence of wax in the rear of the block would gum the operating parts of the device, and is, therefore, undesirable.

In order to give the jaw 12ª of the bar 12 a sufficient length of stroke, the upper left-hand corner of the plate 5ᵈ (see Fig. 2) is provided with a slot 5ᵐ. The sliding plate 7 is retained in position on the bed-plate by means of screws 4 or equivalent devices, whose heads overlap the edges of the plate. These screws are so adjusted as to allow the plate perfect freedom of movement in the performance of its function.

Having thus described my invention, what I claim is—

1. In a foundation-fastener for honey-sections, the combination with a frame comprising a bed-plate and an upright plate, of a horizontal plate slidingly mounted on the bed-plate and having an inclined slot, a lever 9 fulcrumed on the upright plate and having one arm projecting into the slot in the sliding plate, a bar 12 slidingly mounted on the upright plate of the frame and engaging the opposite arm of said lever, a spring-held lever also fulcrumed on the upright plate and engaging the bar 12, a block attached to the forward surface of the upright plate of the frame, said block being surrounded by the section to be operated on by the machine, and forming a guide in applying the foundation to the honey-section, the construction being such that the sliding plate passes between the lower edge of the block and the lower side of the honey-section when the machine is operated, and suitable means for heating said plate sufficiently to soften or melt the wax, substantially as described.

2. In a foundation-fastener for honey-sections, the combination of a frame comprising a bed-plate and an upright plate, a horizontal plate slidingly attached to the bed-plate and adapted to pass through a slot formed between the upright plate and the bed-plate, said sliding plate having a bead located near its front edge and an inclined slot, a lever fulcrumed on the frame and engaging said slot, a bar slidingly mounted on the frame and engaging the lever, a spring-held lever also fulcrumed on the frame and engaging said bar, a guide-block attached to the front side of the frame, and suitable means for heating the sliding plate, substantially as described.

3. In a foundation-fastener for honey-sections, the combination of the frame comprising an open bed-plate and an upright plate, a horizontal plate slidingly attached to the bed-plate above the opening therein and having a bead and an inclined slot, a lever engaging said slot, a bar engaging the lever, another lever for actuating the bar, a guide-block attached to the upright plate, and means for heating the sliding plate from beneath the bed-plate, substantially as described.

4. A combined section-press and foundation-fastener comprising a suitable frame having a bed-plate and an upright plate, a plate slidingly mounted on the bed-plate and having an inclined slot, a lever engaging said slot, an inclined bar slidingly mounted on the upright plate and engaging said lever, a spring-held lever fulcrumed on the frame and engaging said bar which is provided with a forwardly-projecting angle-jaw, a guide-block attached to the upright plate of the frame, and suitable means for heating the sliding plate, substantially as described.

5. In a foundation-fastener for honey-sections, the combination with the frame comprising a bed-plate and an upright plate, of a horizontal plate slidingly attached to the bed-plate and having an inclined slot, a lever engaging said slot, suitable means for actuating the lever whereby the sliding plate is actuated, a guide-block attached to the upright plate, means for adjusting said block to cause its lower edge to occupy a central position regardless of the width or depth of the section, and suitable means for heating the sliding plate whereby it is adapted to soften or melt the wax, substantially as described.

6. A combined section-press and foundation-fastener comprising a suitable frame having a bed-plate and an upright plate, a plate slidingly mounted on the bed-plate and having an inclined slot, a lever engaging said slot, an inclined bar slidingly mounted on the upright plate and engaging said lever, said bar being provided with a forwardly-projecting angle-jaw, and suitable means for actuating the bar and lever simultaneously, as and for the purpose set forth.

In testimony whereof I affix my signature in the presence of two witnesses.

HERMAN RAUCHFUSS.

Witnesses:
CHAS. E. DAWSON,
ALFRED J. O'BRIEN.